US012677192B2

(12) United States Patent
Yang et al.

(10) Patent No.: US 12,677,192 B2
(45) Date of Patent: Jul. 7, 2026

(54) DATA TRANSMISSION METHOD, DEVICE, AND MEDIUM

(71) Applicant: VIVO MOBILE COMMUNICATION CO., LTD., Dongguan (CN)

(72) Inventors: Xiaodong Yang, Dongguan (CN); Wei Bao, Dongguan (CN); Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 611 days.

(21) Appl. No.: 17/889,353

(22) Filed: Aug. 16, 2022

(65) Prior Publication Data

US 2022/0394553 A1 Dec. 8, 2022

Related U.S. Application Data

(63) Continuation of application No. PCT/CN2021/077006, filed on Feb. 20, 2021.

(30) Foreign Application Priority Data

Feb. 21, 2020 (CN) .......................... 202010109140.8

(51) Int. Cl.
*H04W 28/08* (2023.01)
*H04W 36/00* (2009.01)
(52) U.S. Cl.
CPC ..... *H04W 28/0875* (2020.05); *H04W 36/033* (2023.05)
(58) Field of Classification Search
CPC .......................... H04W 28/0875; H04W 36/033
See application file for complete search history.

(56) References Cited

U.S. PATENT DOCUMENTS

| | | | |
|---|---|---|---|
| 2014/0161024 A1 | 6/2014 | Speight et al. | |
| 2019/0208539 A1 | 7/2019 | Christoffersson et al. | |
| 2019/0320361 A1* | 10/2019 | Uchiyama | ........... H04W 36/033 |
| 2020/0205051 A1* | 6/2020 | Takehana | ........... H04B 7/15542 |
| 2021/0377834 A1* | 12/2021 | Luo | ........................ H04W 76/23 |

(Continued)

FOREIGN PATENT DOCUMENTS

| | | |
|---|---|---|
| CN | 107431946 A | 12/2017 |
| CN | 110463339 A | 11/2019 |

(Continued)

OTHER PUBLICATIONS

International Search Report issued in corresponding International Application No. PCT/CN2021/077006, mailed May 12, 2021, 4 pages.

(Continued)

*Primary Examiner* — Kevin T Bates
*Assistant Examiner* — Jaeyoung Kwak
(74) *Attorney, Agent, or Firm* — IPX PLLC

(57) ABSTRACT

A data transmission method, a device, and a medium are provided. The data transmission method includes: sending first notification information to a second target device in a case that a wireless link between a relay terminal device and a first target device is abnormal. The first notification information is used to reduce data traffic transmitted from the second target device to the relay terminal device or to stop data transmission between the second target device and the relay terminal device.

14 Claims, 4 Drawing Sheets

Remote
UE 240

Second relay
UE 230

Base station
210

First relay
UE 220

(56) References Cited

U.S. PATENT DOCUMENTS

| | | | | |
|---|---|---|---|---|
| 2022/0330056 | A1* | 10/2022 | Peng | H04W 76/19 |
| 2023/0075717 | A1* | 3/2023 | Liu | H04L 43/0811 |

FOREIGN PATENT DOCUMENTS

| | | | |
|---|---|---|---|
| WO | 2011020228 | A1 | 2/2011 |
| WO | 2017004720 | A1 | 1/2017 |
| WO | 2019157948 | A1 | 8/2019 |
| WO | 2019242755 | A1 | 12/2019 |

OTHER PUBLICATIONS

Lenovo, Motorola Mobility, "Considerations on the UE-to-Network relay and UE-to-UE relay case", 3GPP TSG-RAN WG2 Meeting #112 electronic, R2-2009858, Oct. 2020.

Lenovo, Motorola Mobility, "Consideration on U2N relay and U2U relay", 3GPP TSG-RAN WG2 Meeting #113 electronic, R2-2101107, Jan. 2021.

Office Action issued in related European Application No. 21756586.0, mailed Sep. 4, 2025, 14 pages.

Extended European Search Report issued in related European Application No. 21756586.0, mailed Jun. 20, 2023, 7 pages.

First Office Action issued in related Chinese Application No. 202010109140.8, mailed Jul. 19, 2022, 7 pages.

Second Office Action issued in related Chinese Application No. 202010109140.8, mailed Apr. 29, 2023, 5 pages.

* cited by examiner

Base
station 110

Relay UE
120

Remote
UE 130

Remote
UE 240

Base station
210

First relay
UE 220

Second relay
UE 230

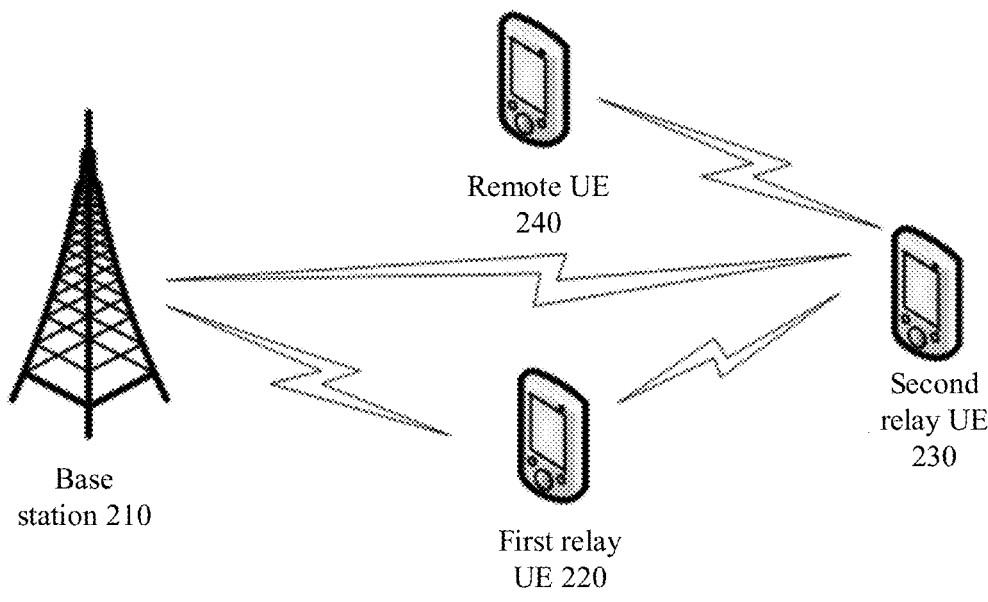

Remote UE
240

Second
relay UE
230

Base
station 210

First relay
UE 220

Send first notification information to a second target device in a case that a wireless link between a relay terminal device and a first target device is abnormal, where the first notification information is used to enable the second target device to reduce data traffic transmitted to the relay terminal device or enable the second target device to stop data transmission with the relay terminal device

Send fourth notification information to a second target device in a case that a wireless link between a relay terminal device and a first target device is abnormal, where the fourth notification information is used to enable the second target device to reduce data traffic transmitted to the relay terminal device or enable the second target device to stop data transmission with the relay terminal device

FIG. 5

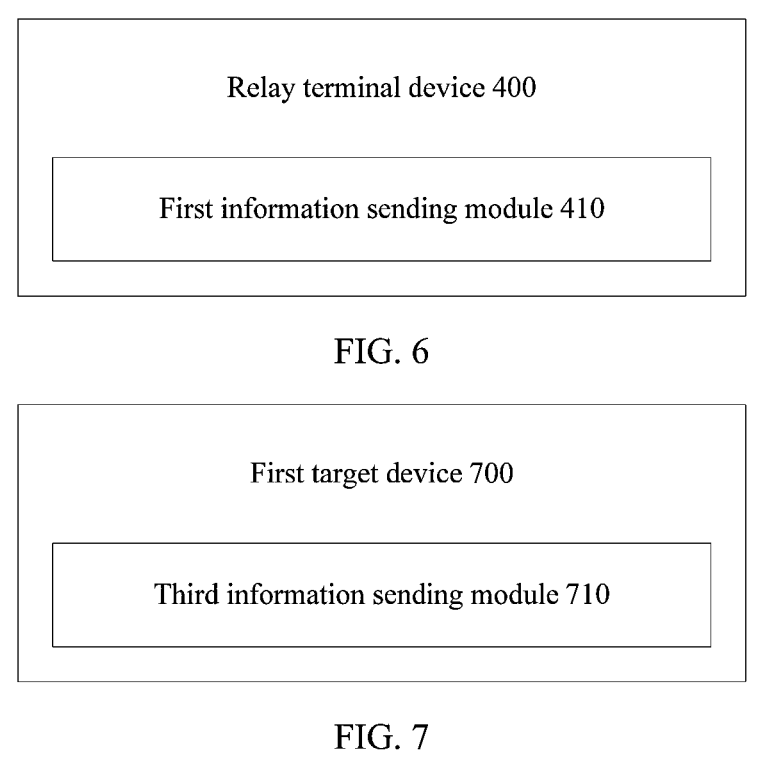

Relay terminal device 400

First information sending module 410

FIG. 6

First target device 700

Third information sending module 710

FIG. 7

DATA TRANSMISSION METHOD, DEVICE, AND MEDIUM

CROSS-REFERENCE TO RELATED APPLICATIONS

This application is a continuation of International Application No. PCT/CN2021/077006, filed on Feb. 20, 2021, which claims priority to Chinese Patent Application No. 202010109140.8, filed on Feb. 21, 2020. The entire contents of each of the above-referenced applications are expressly incorporated herein by reference.

TECHNICAL FIELD

Embodiments of the present disclosure relate to the field of communications technologies, and in particular to a data transmission method, a device, and a medium.

BACKGROUND

Both a Long Term Evolution (LTE) system and a New Radio (NR) system can support a sidelink. The sidelink can enable data transmission to be performed directly between terminal devices through no network device, such as vehicle to everything (V2X) communication.

During data transmission by using the sidelink, communication data between a remote terminal device and a base station may need to be forwarded through at least one relay terminal device. Each relay terminal device may fail to forward data in time, resulting in accumulation of data to be forwarded in the relay terminal device, thereby causing a loss of the data to be forwarded. Therefore, reliability of data transmission is reduced.

SUMMARY

Embodiments of the present disclosure provide a data transmission method, a device, and a medium.

The present disclosure is implemented as follows:

According to a first aspect, an embodiment of the present disclosure provides a data transmission method, applied to a relay terminal device and including:

sending first notification information to a second target device in a case that a wireless link between the relay terminal device and a first target device is abnormal, where the first notification information is used to enable the second target device to reduce data traffic transmitted to the relay terminal device or enable the second target device to stop data transmission with the relay terminal device.

According to a second aspect, an embodiment of the present disclosure provides a data transmission method, applied to a first target device, where the first target device is communicatively connected to a second target device, the first target device is an upstream node device of a relay terminal device, the second target device is a downstream node device of the relay terminal device, and the method includes:

sending fourth notification information to the second target device in a case that a wireless link between the relay terminal device and the first target device is abnormal, where the fourth notification information is used to enable the second target device to reduce data traffic transmitted to the relay terminal device or enable the second target device to stop data transmission with the relay terminal device.

According to a third aspect, an embodiment of the present disclosure provides a relay terminal device, including:

a first information sending module, configured to send first notification information to a second target device in a case that a wireless link between the relay terminal device and a first target device is abnormal, where the first notification information is used to enable the second target device to reduce data traffic transmitted to the relay terminal device or enable the second target device to stop data transmission with the relay terminal device.

According to a fourth aspect, an embodiment of the present disclosure provides a first target device, where the first target device is communicatively connected to a second target device, the first target device is an upstream node device of a relay terminal device, the second target device is a downstream node device of the relay terminal device, and the first target device includes:

a third information sending module, configured to send fourth notification information to a second target device in a case that a wireless link between the relay terminal device and the first target device is abnormal, where the fourth notification information is used to enable the second target device to reduce data traffic transmitted to the relay terminal device or enable the second target device to stop data transmission with the relay terminal device.

According to a fifth aspect, an embodiment of the present disclosure provides a relay terminal device, including a processor, a memory, and a computer program that is stored in the memory and that can be run on the processor, where when the computer program is executed by the processor, the steps of the data transmission method according to the first aspect are implemented.

According to a sixth aspect, an embodiment of the present disclosure provides a first target device, where the first target device is communicatively connected to a second target device, the first target device is an upstream node device of a relay terminal device, the second target device is a downstream node device of the relay terminal device, the first target device includes a processor, a memory, and a computer program that is stored in the memory and that can be run on the processor, and when the computer program is executed by the processor, the steps of the data transmission method according to the second aspect are implemented.

According to a seventh aspect, an embodiment of the present disclosure provides a computer readable storage medium, where the computer readable storage medium stores a computer program, and when the computer program is executed by a processor, the steps of the data transmission method according to the first aspect or the second aspect are implemented.

In the embodiments of the present disclosure, in a case that the wireless link between the relay terminal device and the first target device is abnormal, the first notification information can be directly sent to the second target device, so that the second target device can reduce, according to the first notification information, the data traffic transmitted to the relay terminal device; or the second target device can stop data transmission with the relay terminal device according to the first notification information, so that the relay terminal device can control the data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded. Therefore, reliability of data transmission can be improved.

BRIEF DESCRIPTION OF DRAWINGS

The present disclosure may be better understood based on the following description of specific implementation manners of the present disclosure with reference to the accompanying drawings. The same or similar reference numerals indicate same or similar features.

FIG. 3 is a system architecture diagram of still another sidelink transmission system;

FIG. 4 is a schematic flowchart of an embodiment of a data transmission method according to the present disclosure;

FIG. 5 is a schematic flowchart of another embodiment of the data transmission method according to the present disclosure;

FIG. 6 is a schematic structural diagram of an embodiment of a relay terminal device according to the present disclosure;

FIG. 7 is a schematic structural diagram of an embodiment of a first target device according to the present disclosure.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figures 1, 2:
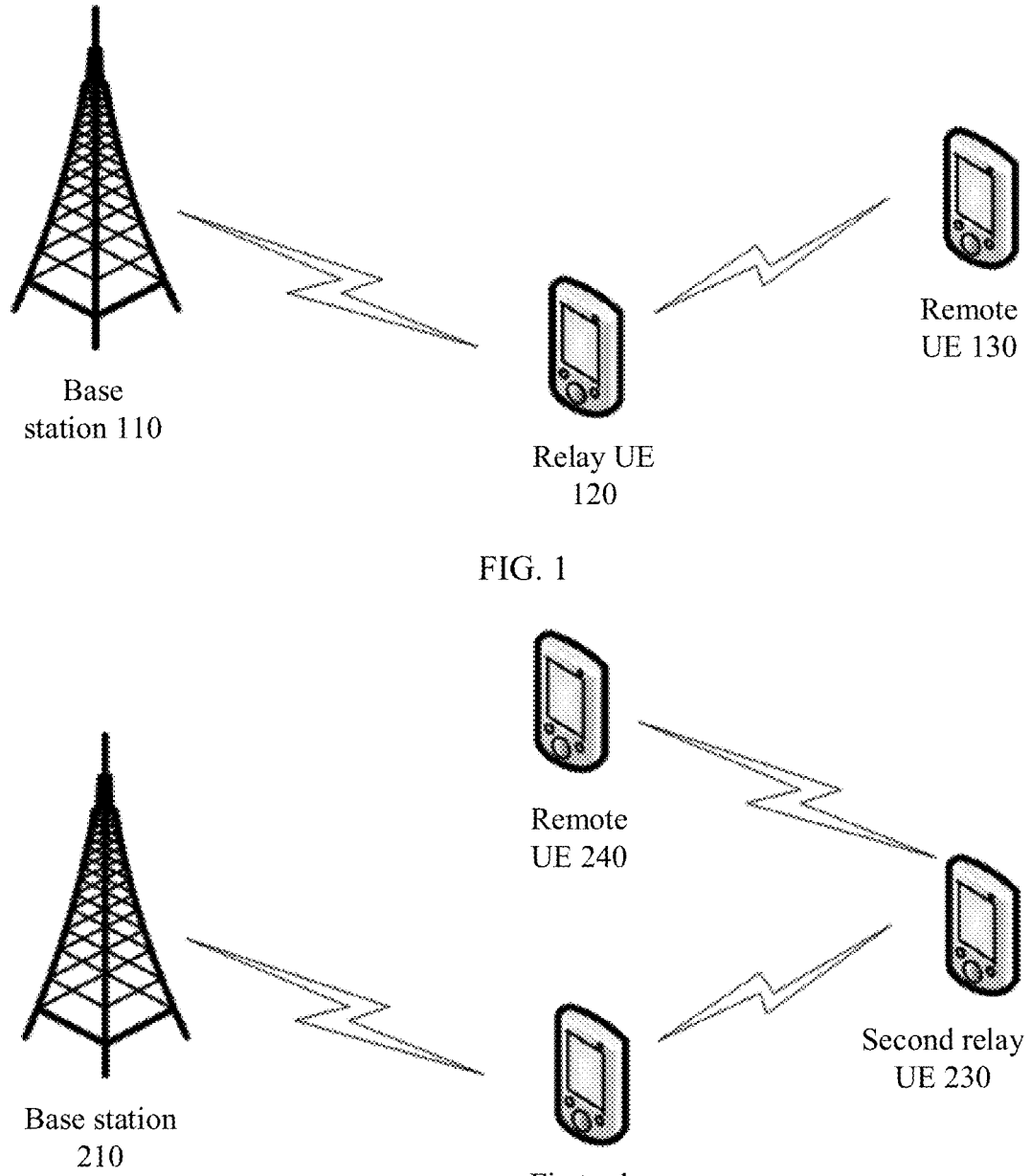
FIG. 1 is a system architecture diagram of a sidelink transmission system.
FIG. 2 is a system architecture diagram of another sidelink transmission system.

FIG. 1 is a system architecture diagram of a sidelink transmission system.

As shown in FIG. 1, the sidelink transmission system can be applied to an LTE system, an NR system, and an Integrated Access and Backhaul (IAB system). The sidelink transmission system may include a base station 110, a relay User Equipment (UE) 120, and a remote UE 130.

The remote UE 130 may be a device used by a user, including but not limited to a mobile phone, a tablet computer, a notebook computer, a palm computer, a vehicle terminal, a wearable device, a pedometer, and the like. The relay UE 120 can be communicatively connected to the remote UE 130 through a sidelink interface, and communicatively connected to the base station 110 for Radio Resource Control (RRC) through a User-uplink (Uu) interface, and the relay UE 120 can be configured to forward data transmitted by the remote UE 130 to the base station 110.

In such sidelink transmission system, the base station 110 is an upstream node device of the relay UE 120, and the remote UE 130 is a downstream node device of the relay UE 120.

FIG. 2 shows a system architecture diagram of another sidelink transmission system.

As shown in FIG. 2, the sidelink transmission system can be applied to an LTE system, an NR system, and an IAB system, and the sidelink transmission system may include a base station 210, a first relay UE 220, a second relay UE 230, and a remote UE 240.

The remote UE 240 may be a device used by a user, including but not limited to a mobile phone, a tablet computer, a notebook computer, a palm computer, a vehicle terminal, a wearable device, a pedometer, and the like. The second relay UE 230 can be communicatively connected to the remote UE 240 and the first relay UE 220 through sidelink interfaces, and the second relay UE 230 can be configured to forward data transmitted by the remote UE 240 to the first relay UE 220. The first relay UE 220 can further perform RRC communication connection with the base station 210 through a Uu interface, and the first relay UE 220 can be configured to forward data transmitted by the second relay UE 230 to the base station 210.

In such sidelink transmission system, the base station 210 is an upstream node device of the first relay UE 220, the second relay UE 230 is a downstream node device of the first relay UE 220; the first relay UE 220 is an upstream node device of the second relay UE 230, and the remote UE 240 is a downstream node device of the second relay UE 230.

FIG. 3 shows a system architecture diagram of still another sidelink transmission system.

As shown in FIG. 3, the sidelink transmission system can be applied to an LTE system, an NR system, and an IAB system, and the sidelink transmission system may include a base station 210, a first relay UE 220, a second relay UE 230, and a remote UE 240.

The remote UE 240 may be a device used by a user, including but not limited to a mobile phone, a tablet computer, a notebook computer, a palm computer, a vehicle terminal, a wearable device, a pedometer, and the like. The second relay UE 230 can be communicatively connected to the remote UE 240 and the first relay UE 220 through sidelink interfaces, and the second relay UE 230 can be configured to forward data transmitted by the remote UE 240 to the first relay UE 220. The second relay UE 230 can further perform RRC communication connection with the base station 210 through a Uu interface. The first relay UE 220 can further perform RRC communication connection with the base station 210 through the Uu interface, and the first relay UE 220 can be configured to forward data transmitted by the second relay UE 230 to the base station 210.

In such sidelink transmission system, traffic control can be performed together by the base station 210 for the first relay UE 220 and the second relay UE 230. The base station 210 is an upstream node device of the first relay UE 220, the second relay UE 230 is a downstream node device of the first relay UE 220; and the first relay UE 220 is an upstream node device of the second relay UE 230, and the remote UE 240 is a downstream node device of the second relay UE 230.

At present, in the sidelink transmission systems shown in FIG. 1 to FIG. 3, during data transmission, each relay UE may fail to forward data in time. In this case, the relay UE cannot control amount of received data, resulting in accumulation of data to be forwarded in the relay UE, thereby causing a loss of the data to be forwarded, so that reliability of data transmission is reduced.

Embodiments of the present disclosure provide a data transmission method, a device, and a medium. The following first describes the data transmission method in detail provided in an embodiment of the present disclosure.

FIG. 4 shows a schematic flowchart of an embodiment of a data transmission method according to the present disclosure.

In some embodiments of the present disclosure, the method shown in FIG. 4 may be performed by a relay terminal device. In some embodiments, the relay terminal device may be a device used to perform data forwarding between an upstream node device and a downstream node device in any one of a single-hop sidelink transmission system, a double-hop sidelink transmission system, or a multi-hop sidelink transmission system. For example, the relay terminal device may be a relay UE 120 shown in FIG. 1. For another example, the relay terminal device may be a first relay UE 220 or a second relay UE 230 shown in FIG. 2 or FIG. 3.

As shown in FIG. 4, the data transmission method may include:

S310: Send first notification information to a second target device in a case that a wireless link between a relay terminal device and a first target device is abnormal.

The first notification information is used to enable the second target device to reduce data traffic transmitted to the relay terminal device or enable the second target device to stop data transmission with the relay terminal device.

In this embodiment of the present disclosure, in a case that the wireless link between the relay terminal device and the first target device is abnormal, the first notification information can be directly sent to the second target device, so that the second target device can reduce, according to the first notification information, the data traffic transmitted to the relay terminal device; or the second target device can stop data transmission with the relay terminal device according to the first notification information, so that the relay terminal device can control the data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded, so that reliability of data transmission can be improved.

In some embodiments of the present disclosure, that the wireless link between the relay terminal device and the first target device is abnormal may include at least one of the following:

wireless link connection or wireless link handover between the relay terminal device and the first target device fails;

quality of a wireless interface signal between the first target device and the relay terminal device is less than a preset quality threshold;

amount of data buffered by the relay terminal device is greater than or equal to a preset amount threshold;

a timer T310 for determining that wireless link connection between the relay terminal device and the first target device fails is started; or a timer T311 for reestablishing the wireless link between the relay terminal device and the first target device is started.

In some embodiments, when the wireless link connection or wireless link handover between the relay terminal device and the first target device fails, the timer T310 for determining that the wireless link connection fails is started, or the timer T311 for reestablishing the wireless link is started, it means that the wireless connection between the relay terminal device and the first target device is abnormal. Therefore, it can be determined that the wireless link between the relay terminal device and the first target device is abnormal. When quality of a wireless interface signal between the first target device and the relay terminal device is less than a preset quality threshold, it means that quality of a communication signal between the relay terminal device and the first target device is poor, and the relay terminal device cannot normally transmit data to the first target device. Therefore, it can be determined that the wireless link between the relay terminal device and the first target device is abnormal. When the amount of data buffered by the relay terminal device is greater than or equal to the preset amount threshold, it means that excessive amount of data to be forwarded is accumulated in the relay terminal device, and the reason for accumulation of the excessive amount of data to be forwarded in the relay terminal device may be that the relay terminal device cannot normally transmit data to the first target device. Therefore, it can be determined that the wireless link between the relay terminal device and the first target device is abnormal.

In some embodiments of the present disclosure, the wireless interface signal refers to an interface test signal sent by the first target device to the relay terminal device through a wireless link interface. The wireless link interface may include at least one of a sidelink interface and a Uu interface.

In this embodiment of the present disclosure, a method for determining the quality of the wireless interface quality may include:

receiving an interface test signal sent by the first target device to the relay terminal device; and determining the quality of the wireless interface signal according to a signal strength and/or signal power of the received interface test signal.

In some embodiments, the first target device sends an interface test signal to the relay terminal device every predetermined time interval, and the relay terminal device can determine the signal strength of the interface test signal sent by the first target device as the quality of the wireless interface signal. In this case, the preset quality threshold includes a preset strength threshold, and the relay terminal device can compare the determined signal strength with the preset strength threshold, and in a case that the determined signal strength is less than the preset strength threshold, it can be determined that the wireless link between the relay terminal device and the first target device is abnormal.

In some other embodiments, the first target device sends an interface test signal to the relay terminal device every predetermined time interval, and the relay terminal device can determine the signal power of the interface test signal sent by the first target device as the quality of the wireless interface signal. In this case, the preset quality threshold includes a preset power threshold, and the relay terminal device can compare the determined signal power with the preset power threshold, and in a case that the determined signal power is less than the preset power threshold, it can be determined that the wireless link between the relay terminal device and the first target device is abnormal.

In still some other embodiments, the first target device sends an interface test signal to the relay terminal device every predetermined time interval, and the relay terminal device can further determine a weighted sum of the signal strength and signal power of the interface test signal sent by the first target device as the quality of the wireless interface signal. The relay terminal device can compare the determined weighted sum with the preset power threshold, and in a case that the determined weighted sum is less than the preset power threshold, it can be determined that the wireless link between the relay terminal device and the first target device is abnormal.

In some embodiments of the present disclosure, the first target device may be an upstream node device of the relay terminal device, and the second target device may be a downstream node device of the relay terminal device.

In some embodiments, when a wireless link between the relay terminal device and its upstream node device is abnormal, the relay terminal device can notify its downstream node device of reducing data traffic transmitted to the relay terminal device or stopping data transmission with the relay terminal device.

The downstream node device of the relay terminal device may be another relay terminal device or a remote terminal device. The remote terminal device may be the remote UE 130 shown in FIG. 1, or may be the remote UE 240 shown in FIG. 2 or FIG. 3, and these devices separately communicate with the relay terminal device through the sidelink interface. Therefore, in these embodiments, the relay terminal device can send the first notification information to the second target device through the sidelink interface.

In some embodiments, the first notification information may be used to notify the second target device of reducing the amount of data transmitted to the relay terminal device, or reducing a transmission speed of data transmission to the relay terminal device, or stopping transmitting data to the relay terminal device, or triggering a reselection process of the second target device, so that the second target device can reduce the data traffic transmitted to the relay terminal device or stop data transmission with the relay terminal device.

In these embodiments, the first notification information may include at least one of the following:

notification information used to indicate that the second target device stops sending data to the relay terminal device, so that the second target device can stop sending data to the relay terminal device in response to the first notification information after receiving the first notification information;

notification information used to indicate a type of data that the second target device stops sending, so that the second target device can stop sending data corresponding to the data type to the relay terminal device in response to the first notification information after receiving the first notification information, where the data type includes at least one of a transmission resource, a transmission carrier, a logical channel, or a service;

notification information used to indicate duration for stopping sending by the second target device, so that the second target device can stop, in response to the first notification information, sending data to the relay terminal device within the duration for stopping sending, after receiving the first notification information, where the duration for stopping sending is used to indicate duration for which the second target device stops sending;

notification information used to indicate a data transmission rate to be changed of the second target device, so that the second target device can send data to the relay terminal device at the data transmission rate to be changed in response to the first notification information after receiving the first notification information, where the data transmission rate to be changed is used to indicate a reduced data transmission rate;

notification information used to indicate that the second target device performs reselection of a transmission resource, so that the second target device can trigger the reselection of a transmission resource in response to the first notification information after receiving the first notification information;

notification information used to indicate that the second target device performs reselection of a transmission carrier, so that the second target device can trigger the reselection of a transmission carrier in response to the first notification information after receiving the first notification information; or notification information used to indicate that the second target device performs reselection of a relay terminal device, so that the second target device can trigger the reselection of a relay terminal device in response to the first notification information after receiving the first notification information.

It should be noted that, in this embodiment of the present disclosure, the data transmission rate to be changed may be determined by the relay terminal device according to an abnormality degree of the wireless link between the relay terminal device and the first target device, and the data transmission rate to be changed may also be a preset data transmission rate, which is not limited herein.

Therefore, when the relay terminal device finds that wireless link communication with its upstream node device is not good, the relay terminal device can directly notify its downstream node device of reducing or stopping data sending to the relay terminal device through a sidelink interface, so as to prevent that data to be forwarded in the relay terminal device cannot be forwarded in time, and further prevent accumulation of the data to be forwarded in the relay terminal device, and then prevent a loss of the data to be forwarded. Therefore, reliability of data transmission can be improved.

In some other embodiments, in a case that the first target device is a network device, the first target device can further be communicatively connected to the second target device. As shown in FIG. 3, that is, the upstream node device of the relay terminal device can further be directly communicatively connected to the downstream node device of the relay terminal device.

In these embodiments, the data transmission method may further include:

sending second notification information to the first target device in a case that the wireless link between the relay terminal device and the first target device is abnormal. The second notification information is used to characterize abnormality of the wireless link between the relay terminal device and the first target device, and is used for the first target device to generate third notification information. The third notification information is used to be sent to the second target device by the first target device, and used to enable the second target device to reduce data traffic transmitted to the relay terminal device or enable the second target device to stop data transmission with the relay terminal device.

In a case that the wireless link between the relay terminal device and its upstream node device is abnormal, if there is still a lot of data to be sent between the relay terminal device and its downstream node device before the first notification information is sent, the relay terminal device cannot send the first notification information to its downstream node device in time. In this case, the relay terminal device can report that the wireless link between the relay terminal device and its upstream node device is abnormal to its upstream node device through the second notification information, and its upstream node device notifies its downstream node device of reducing data traffic transmitted to the relay terminal device or stopping data transmission with the relay terminal device.

In some embodiments, the relay terminal device can send the second notification information to its upstream node device, so that the upstream node device determines that a wireless link between the relay terminal device and the upstream node device is abnormal, so that the upstream node device sends the third notification information to the downstream node device of the relay terminal device in response to the second notification information after the third notification information is generated according to the second notification information, so as to notify, through the third notification information, the downstream node device of reducing the data traffic transmitted to the relay terminal device or stopping data transmission with the relay terminal device.

The upstream node device of the relay terminal device may be another relay terminal device or a network device. The network device may be the base station 110 shown in FIG. 1, or may be the base station 210 shown in FIG. 2 or FIG. 3. The another relay terminal device communicates with the downstream node device of the relay terminal device through the sidelink interface, and the network device communicates with the downstream node device of the relay terminal device through the Uu interface.

Therefore, in these embodiments, the first target device can send the third notification information to the second target device through the sidelink interface or the Uu interface, and the relay terminal device can send the second notification information to the first target device through the sidelink interface or the Uu interface.

In some embodiments, the third notification information may be used to notify the second target device of reducing the amount of data transmitted to the relay terminal device, or reducing a transmission speed of data transmission to the relay terminal device, or stopping transmitting data to the relay terminal device, or triggering a reselection process of the second target device, so that the second target device can reduce the data traffic transmitted to the relay terminal device or stop data transmission with the relay terminal device.

In these embodiments, the third notification information may include at least one of the following:

notification information used to indicate that the second target device stops sending data to the relay terminal device;

notification information used to indicate a type of data that the second target device stops sending;

notification information used to indicate duration for stopping sending by the second target device;

notification information used to indicate a data transmission rate to be changed of the second target device;

notification information used to indicate that the second target device performs reselection of a transmission resource;

notification information used to indicate that the second target device performs reselection of a transmission carrier;

notification information used to indicate that the second target device performs reselection of the relay terminal device; or notification information used to indicate an optional relay terminal device for the second target device.

Content of the third notification information is similar to that of the first notification information, which is not repeated herein.

The notification information in the third notification information used to indicate the optional relay terminal device for the second target device can enable the second target device to determine a relay terminal device that can be selected when the relay terminal device is reselected. In some embodiments, the optional relay terminal device is a relay terminal device that can be reselected and that is designated by the first target device for the second target device.

Therefore, when the relay terminal device finds that wireless link communication with its upstream node device is not good, its upstream node device can directly notify its downstream node device of reducing or stopping data sending to the relay terminal device through the sidelink interface, so as to prevent that data to be forwarded in the relay terminal device cannot be forwarded in time, and further prevent accumulation of the data to be forwarded in the relay terminal device, and then prevent a loss of the data to be forwarded. Therefore, reliability of data transmission can be improved.

In some other embodiments of the present disclosure, the first target device may be a downstream node device of the relay terminal device, and the second target device may be an upstream node device of the relay terminal device.

In some embodiments, when a wireless link between the relay terminal device and its downstream node device is abnormal, the relay terminal device can notify its upstream node device of reducing data traffic transmitted to the relay terminal device or stopping data transmission with the relay terminal device.

The upstream node device of the relay terminal device may be another relay terminal device or a network device. The network device may be the base station 110 shown in FIG. 1, or may be the base station 210 shown in FIG. 2 or FIG. 3. The another relay terminal device communicates with the relay terminal device through the sidelink interface, and the network device communicates with the relay terminal device through the Uu interface.

Therefore, in these embodiments, the relay terminal device can send the first notification information to the second target device through the sidelink interface or the Uu interface.

In some embodiments, the first notification information may be used to notify the second target device of reducing the amount of data transmitted to the relay terminal device, or reducing a transmission speed of data transmission to the relay terminal device, so that the second target device can reduce the data traffic transmitted to the relay terminal device or stop data transmission with the relay terminal device.

In these embodiments, the first notification information may include at least one of the following:

notification information used to indicate that the second target device stops sending data to the relay terminal device;

notification information used to indicate a type of data that the second target device stops sending;

notification information used to indicate duration for stopping sending by the second target device; or notification information used to indicate a data transmission rate to be changed of the second target device.

Content of the first notification information has been described above, and will not be repeated herein again. Therefore, when the relay terminal device finds that wireless link communication with its downstream node device is not good, the relay terminal device can directly notify its upstream node device of reducing or stopping data sending to the relay terminal device through the sidelink interface, so as to prevent that data to be forwarded in the relay terminal device cannot be forwarded in time, and further prevent accumulation of the data to be forwarded in the relay terminal device, and then prevent a loss of the data to be forwarded. Therefore, reliability of data transmission can be improved.

To sum up, through the data transmission method provided by the embodiments of the present disclosure, in a case that the relay terminal device determines that the wireless link between the relay terminal device and the first target device is abnormal, the data traffic transmitted by the second target device to the relay terminal device can be controlled reasonably, so as to prevent that the data be forwarded in the relay terminal device cannot be forwarded in time, further prevent accumulation of the data to be forwarded in the relay terminal device, and then prevent the loss of the data to be forwarded. Therefore, the reliability of data transmission can be improved.

FIG. 5 shows a schematic flowchart of another embodiment of a data transmission method according to the present disclosure.

In some embodiments of the present disclosure, the method shown in FIG. 5 may be performed by a first target device, and the first target device may be communicatively connected to a second target device. The first target device may be an upstream node device of a relay terminal device, and the second target device may be a downstream node device of the relay terminal device. The relay terminal device may be a device used to perform data forwarding between the upstream node device and the downstream node device in any one of a single-hop sidelink transmission system, a double-hop sidelink transmission system, or a multi-hop sidelink transmission system. For example, the first target device may be the base station 210 shown in FIG. 3, the relay terminal device may be the first relay UE 220 shown in FIG. 3, and the second target device may be the second relay UE 230 shown in FIG. 3. For another example, in a case that the first relay UE 220 shown in FIG. 3 is communicatively connected to the remote UE 240, the first target device may be the first relay UE 220 shown in FIG. 3, the relay terminal device may be the second relay UE 230 shown in FIG. 3, and the second target device may be the remote UE 240 shown in FIG. 3.

As shown in FIG. 5, the data transmission method may include:

S610: sending fourth notification information to a second target device in a case that a wireless link between a relay terminal device and a first target device is abnormal.

The fourth notification information is used to enable the second target device to reduce data traffic transmitted to the relay terminal device or enable the second target device to stop data transmission with the relay terminal device.

In this embodiment of the present disclosure, in a case that the wireless link between the relay terminal device and the first target device is abnormal, the first target device can directly send the fourth notification information to the second target device, so that the second target device can reduce, according to the fourth notification information, the data traffic transmitted to the relay terminal device; or the second target device can stop data transmission with the relay terminal device according to the fourth notification information, so that the first target device can control data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded. Therefore, reliability of data transmission can be improved.

In some embodiments of the present disclosure, that the wireless link between the relay terminal device and the first target device is abnormal may include at least one of the following:

wireless link connection or wireless link handover between the relay terminal device and the first target device fails;

quality of a wireless interface signal between the first target device and the relay terminal device is less than a preset quality threshold;

amount of data buffered by the relay terminal device is greater than or equal to a preset amount threshold;

a timer T310 for determining that wireless link connection between the relay terminal device and the first target device fails is started; or a timer T311 for reestablishing the wireless link between the relay terminal device and the first target device is started.

A method for the first target device to determine that the wireless link between the relay terminal device and the first target device is abnormal is similar to the method in the embodiment shown in FIG. 4, and details are not described herein again.

In some embodiments of the present disclosure, the fourth notification information may include at least one of the following:

notification information used to indicate that the second target device stops sending data to the relay terminal device;

notification information used to indicate a type of data that the second target device stops sending;

notification information used to indicate duration for stopping sending by the second target device;

notification information used to indicate a data transmission rate to be changed of the second target device;

notification information used to indicate that the second target device performs reselection of a transmission resource;

notification information used to indicate that the second target device performs reselection of a transmission carrier;

notification information used to indicate that the second target device performs reselection of the relay terminal device; or notification information used to indicate an optional relay terminal device for the second target device.

The fourth notification information is similar to the third notification information in the embodiment shown in FIG. 4, and details are not described herein again.

FIG. 6 shows a schematic structural diagram of an embodiment of a relay terminal device according to the present disclosure.

In some embodiments of the present disclosure, the relay terminal device show in FIG. 6 may be a device used to perform data forwarding between an upstream node device and a downstream node device in any one of a single-hop sidelink transmission system, a double-hop sidelink transmission system, or a multi-hop sidelink transmission system. For example, the relay terminal device may be the relay UE 120 shown in FIG. 1. For another example, the relay terminal device may be the first relay UE 220 or the second relay UE 230 shown in FIG. 2 or FIG. 3.

As shown in FIG. 6, the relay terminal device 400 may include:

a first information sending module 410, configured to send first notification information to a second target device in a case that a wireless link between a relay terminal device and a first target device is abnormal.

The first notification information is used to enable the second target device to reduce data traffic transmitted to the relay terminal device or enable the second target device to stop data transmission with the relay terminal device.

In this embodiment of the present disclosure, in a case that the wireless link between the relay terminal device and the first target device is abnormal, the relay terminal device can directly send the first notification information to the second target device, so that the second target device can reduce, according to the first notification information, the data traffic transmitted to the relay terminal device; or the second target device can stop data transmission with the relay terminal device according to the first notification information, so that the relay terminal device can control the data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded. Therefore, reliability of data transmission can be improved.

In some embodiments of the present disclosure, that the wireless link between the relay terminal device and the first target device is abnormal include at least one of the following:

wireless link connection or wireless link handover between the relay terminal device and the first target device fails;

quality of a wireless interface signal between the first target device and the relay terminal device is less than a preset quality threshold;

amount of data buffered by the relay terminal device is greater than or equal to a preset amount threshold;

a timer for determining that wireless link connection between the relay terminal device and the first target device fails is started; or a timer for reestablishing the wireless link between the relay terminal device and the first target device is started.

In some embodiments of the present disclosure, the first target device is an upstream node device of the relay terminal device, and the second target device is a downstream node device of the relay terminal device.

In some embodiments of the present disclosure, the first notification information includes at least one of the following:

notification information used to indicate that the second target device stops sending data to the relay terminal device;

notification information used to indicate a type of data that the second target device stops sending;

notification information used to indicate duration for stopping sending by the second target device;

notification information used to indicate a data transmission rate to be changed of the second target device;

notification information used to indicate that the second target device performs reselection of a transmission resource;

notification information used to indicate that the second target device performs reselection of a transmission carrier; or notification information used to indicate that the second target device performs reselection of the relay terminal device.

In some embodiments of the present disclosure, the first target device may further be communicatively connected to the second target device.

In these embodiments, the relay terminal device 400 may further include:

a second information sending module, configured to send second notification information to the first target device in a case that the wireless link is abnormal.

The second notification information is used to characterize abnormality of the wireless link, and is used for the first target device to generate third notification information. The third notification information is used to be sent to the second target device by the first target device, and used to enable the second target device to reduce data traffic transmitted to the relay terminal device or enable the second target device to stop data transmission with the relay terminal device.

In some embodiments of the present disclosure, the third notification information includes at least one of the following:

notification information used to indicate that the second target device stops sending data to the relay terminal device;

notification information used to indicate a type of data that the second target device stops sending;

notification information used to indicate duration for stopping sending by the second target device;

notification information used to indicate a data transmission rate to be changed of the second target device;

notification information used to indicate that the second target device performs reselection of a transmission resource;

notification information used to indicate that the second target device performs reselection of a transmission carrier;

notification information used to indicate that the second target device performs reselection of the relay terminal device; or notification information used to indicate an optional relay terminal device for the second target device.

In some embodiments of the present disclosure, the first target device is a downstream node device of the relay terminal device, and the second target device is an upstream node device of the relay terminal device.

In some embodiments of the present disclosure, the first notification information includes at least one of the following:

notification information used to indicate that the second target device stops sending data to the relay terminal device;

notification information used to indicate a type of data that the second target device stops sending;

notification information used to indicate duration for stopping sending by the second target device; or notification information used to indicate a data transmission rate to be changed of the second target device.

The relay terminal device 400 provided in this embodiment of the present disclosure can implement the processes implemented by the relay terminal device in the foregoing method embodiment shown in FIG. 4 and achieve effects thereof. To avoid repetition, details are not described herein again.

FIG. 7 shows a schematic structural diagram of an embodiment of a first target device according to the present disclosure.

In some embodiments of the present disclosure, a first target device 700 shown in FIG. 7 may be communicatively connected to a second target device, the first target device 700 may be an upstream node device of a relay terminal device, and the second target device may be a downstream node device of the relay terminal device. The relay terminal device may be a device used to perform data forwarding between the upstream node device and the downstream node device in any one of a single-hop sidelink transmission system, a double-hop sidelink transmission system, or a multi-hop sidelink transmission system. For example, the first target device may be the base station 210 shown in FIG. 3, the relay terminal device may be the first relay UE 220 shown in FIG. 3, and the second target device may be the second relay UE 230 shown in FIG. 3. For another example, in a case that the first relay UE 220 shown in FIG. 3 is communicatively connected to the remote UE 240, the first target device may be the first relay UE 220 shown in FIG. 3, the relay terminal device may be the second relay UE 230 shown in FIG. 3, and the second target device may be the remote UE 240 shown in FIG. 3.

As shown in FIG. 7, the first target device 700 may include:

a third information sending module 710, configured to send fourth notification information to a second target device in a case that a wireless link between the relay terminal device and the first target device is abnormal.

The fourth notification information is used to enable the second target device to reduce data traffic transmitted to the relay terminal device or enable the second target device to stop data transmission with the relay terminal device.

In this embodiment of the present disclosure, in a case that the wireless link between the relay terminal device and the first target device is abnormal, the first target device can directly send the fourth notification information to the second target device, so that the second target device can reduce, according to the fourth notification information, the data traffic transmitted to the relay terminal device; or the second target device can stop data transmission with the relay terminal device according to the fourth notification information, so that the first target device can control the data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded. Therefore, reliability of data transmission can be improved.

In some embodiments of the present disclosure, that the wireless link between the relay terminal device and the first target device is abnormal may include at least one of the following:

wireless link connection or wireless link handover between the relay terminal device and the first target device fails;

quality of a wireless interface signal between the first target device and the relay terminal device is less than a preset quality threshold;

amount of data buffered by the relay terminal device is greater than or equal to a preset amount threshold;

a timer for determining that wireless link connection between the relay terminal device and the first target device fails is started; or a timer for reestablishing the wireless link between the relay terminal device and the first target device is started.

In some embodiments of the present disclosure, the fourth notification information may include at least one of the following:

notification information used to indicate that the second target device stops sending data to the relay terminal device;

notification information used to indicate a type of data that the second target device stops sending;

notification information used to indicate duration for stopping sending by the second target device;

notification information used to indicate a data transmission rate to be changed of the second target device;

notification information used to indicate that the second target device performs reselection of a transmission resource;

notification information used to indicate that the second target device performs reselection of a transmission carrier;

notification information used to indicate that the second target device performs reselection of the relay terminal device; or notification information used to indicate an optional relay terminal device for the second target device.

The relay terminal device 700 provided in this embodiment of the present disclosure can implement the processes implemented by the first target device in the method embodiment in FIG. 5 and achieve effects thereof. To avoid repetition, details are not described herein again.

Figure 8:
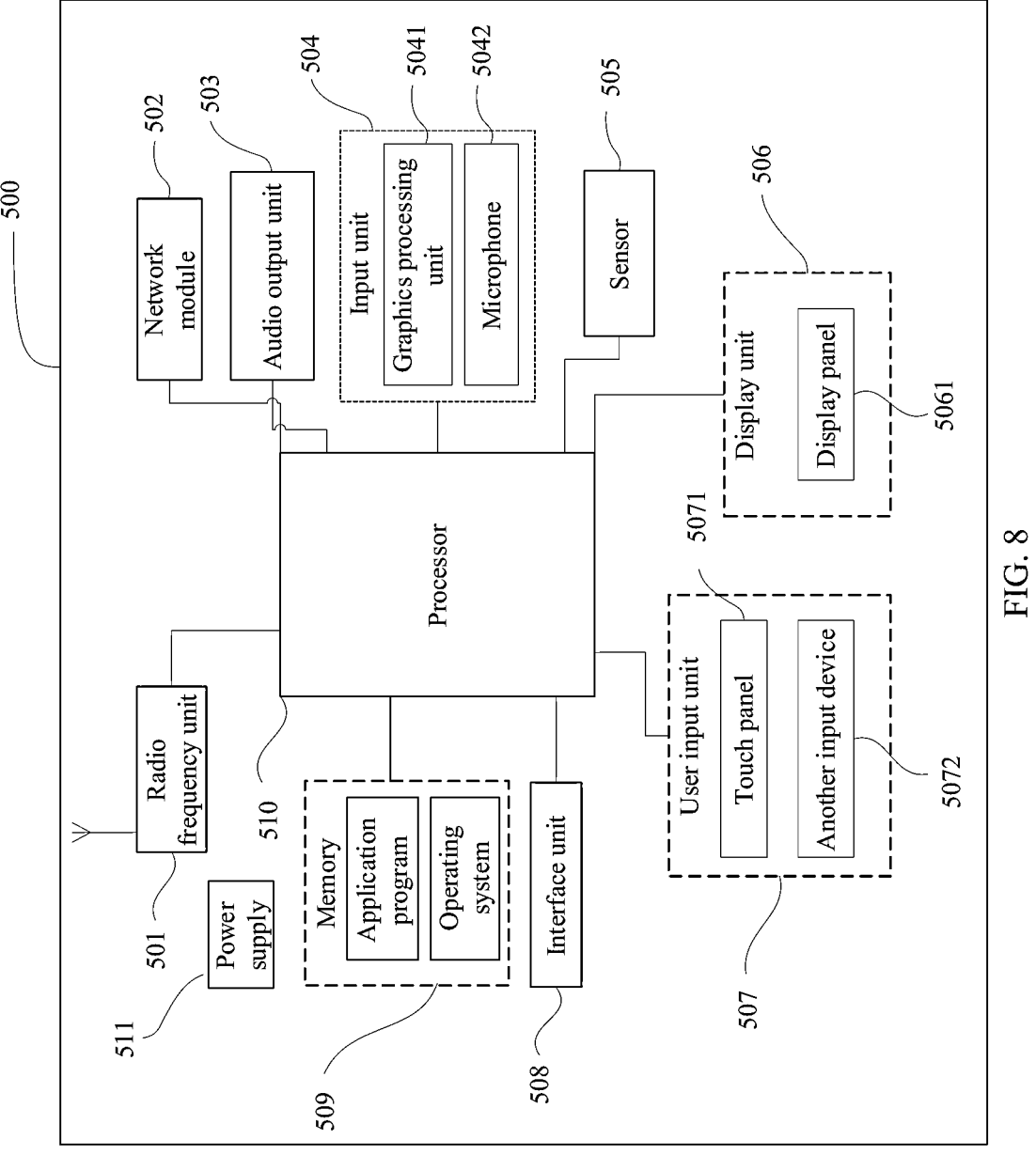
FIG. 8 is a schematic diagram of a hardware structure of an embodiment of a relay terminal device according to the present disclosure.

FIG. 8 is a schematic diagram of a hardware structure of an embodiment of a relay terminal device according to the present disclosure.

As shown in FIG. 8, the relay terminal device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. It can be understood by a person skilled in the art that, a structure of the relay terminal device shown in FIG. 8 does not constitute any limitation on the relay terminal device, and the relay terminal device may include more or fewer components than those shown in the figure, or combine some components, or have different component arrangements.

The processor 510 is configured to send first notification information to a second target device in a case that a wireless link between the relay terminal device and a first target device is abnormal, where the first notification information is used to enable the second target device to reduce data traffic transmitted to the relay terminal device or enable the second target device to stop data transmission with the relay terminal device.

In this embodiment of the present disclosure, in a case that the wireless link between the relay terminal device and the first target device is abnormal, the first notification information can be directly sent to the second target device, so that the second target device can reduce, according to the first notification information, the data traffic transmitted to the relay terminal device; or the second target device can stop data transmission with the relay terminal device according to the first notification information, so that the relay terminal device can control the data traffic transmitted by the second target device to the relay terminal device, so as to prevent that data to be forwarded in the relay terminal device cannot be forwarded in time, further prevent accumulation of the data to be forwarded in the relay terminal device, and then prevent a loss of the data to be forwarded. Therefore, reliability of data transmission can be improved.

It should be understood that in this embodiment of the present disclosure, the radio frequency unit 501 may be configured to receive and transmit information, or receive and transmit signals during a call. In some embodiments, the radio frequency unit transmits downlink data from a base station, after receiving the downlink data, to the processor 510 for processing; and transmits uplink data to the base station. Generally, the radio frequency unit 501 includes but is not limited to: an antenna, at least one amplifier, a transceiver, a coupler, a low noise amplifier, a duplexer, and the like. In addition, the radio frequency unit 501 can further communicate with a network and another device through a wireless communications system.

The relay terminal device provides wireless broadband Internet access for the user by using the network module 502, for example, helping the user send and receive an e-mail, browse a web page, and access streaming media.

The audio output unit 503 may convert audio data received by the radio frequency unit 501 or the network module 502 or stored in the memory 509 into an audio signal and output the audio signal as a sound. In addition, the audio output unit 503 can further provide an audio output (for example, a call signal received voice, or a message received voice) related to a specific function performed by the relay terminal device 500. The audio output unit 503 includes a loudspeaker, a buzzer, a telephone receiver, and the like.

The input unit 504 is configured to receive an audio signal or a video signal. The input unit 504 may include a Graphics Processing Unit (GPU) 5041 and a microphone 5042. The graphics processing unit 5041 processes image data of a static picture or a video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 can receive sound and can process such sound into audio data. The processed audio data may be converted in a call mode into a format that can be sent by the radio frequency unit 501 to a mobile communication base station for outputting.

The relay terminal device 500 further includes at least one sensor 505, such as an optical sensor, a motion sensor, and other sensors. In some embodiments, the light sensor includes an ambient light sensor and a proximity sensor. The ambient light sensor can adjust luminance of a display panel 5061 based on brightness of ambient light. The proximity sensor can turn off the display panel 5061 and/or backlight when the relay terminal device 500 moves to an ear. As a type of the motion sensor, an accelerometer sensor may detect an acceleration value in each direction (generally, three axes), and detect a value and a direction of gravity when the accelerometer sensor is static, and may be used for recognizing a posture of the relay terminal device (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by a user or information provided for a user. The display unit 506 may include a display panel 5061, and the display panel 5061 may be configured in a form of a Liquid Crystal Display (LCD), an Organic Light-Emitting Diode (OLED), or the like.

The user input unit 507 may be configured to receive input digit or character information, and generate a key signal input related to a user setting and function control of the relay terminal device. In some embodiments, the user input unit 507 includes a touch panel 5071 and another input device 5072. The touch panel 5071 is also referred to as a touchscreen, and may collect a touch operation performed by a user on or near the touch panel 5071 (such as an operation performed by a user on or near the touch panel 5071 by using any proper object or accessory, such as a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in multiple types such as a resistive type, a capacitive type, an infrared ray, and a surface acoustic wave. In addition to the touch panel 5071, the user input unit 507 may further include the another input device 5072. In some embodiments, the another input device 5072 may include but is not limited to: a physical keyboard, function keys (for example, a volume control key and an on/off key), a trackball, a mouse, or a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides corresponding visual output on the display panel 5061 based on the type of the touch event. Although in FIG. 8, the touch panel 5071 and the display panel 5061 are configured as two independent components to implement input and output functions of the relay terminal device, in some embodiments, the touch panel 5071 and the display panel 5061 can be integrated to implement the input and output functions of the relay terminal device. Details are not limited herein.

The interface unit 508 is an interface for connecting an external apparatus to the relay terminal device 500. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 508 may be configured to receive input (for example, data information and power) from an external apparatus and transmit the received input to one or more elements in the relay terminal device 500 or may be configured to transmit data between the relay terminal device 500 and the external apparatus.

The memory 509 may be configured to store a software program and various pieces of data. The memory 509 may mainly include a program storage area and a data storage area. The program storage area may store an operating system, an application program required by at least one function (for example, a sound play function or an image display function), and the like. The data storage area may store data (for example, audio data or an address book) or the like created based on use of a mobile phone. In addition, the memory 509 may include a high-speed random access memory, and may further include a nonvolatile memory, for example, at least one magnetic disk storage device, a flash storage device, or another volatile solid-state storage device.

The processor 510 is a control center of the relay terminal device, is connected to each part of the entire relay terminal device by using various interfaces and lines, and performs various functions of the relay terminal device and data processing by running or executing the software program and/or the module that are/is stored in the memory 509 and invoking data stored in the memory 509, to perform overall monitoring on the relay terminal device. The processor 510 may include one or more processing units. In some embodiments, the processor 510 may be integrated with an application processor and a modem processor. The application processor mainly processes an operating system, a user interface, an application program, and the like. The modem processor mainly processes wireless communication. It can be understood that, the modem processor may not be integrated into the processor 510.

The relay terminal device 500 may further include a power supply 511 (such as a battery) that supplies power to each component. In some embodiments, the power supply 511 may be logically connected to the processor 510 by using a power management system, to implement functions such as charging, discharging, and power consumption management by using the power management system.

In addition, the relay terminal device 500 includes some functional modules not shown, and details are not described herein.

An embodiment of the present disclosure further provides a relay terminal device, including the processor 510, the memory 509, and a computer program that is stored in the memory 509 and that can be run on the processor 510, where when the computer program is executed by the processor 510, the processes of the foregoing embodiments of the data transmission method are implemented, and a same technical effect can be achieved. To avoid repetition, details are not described herein again.

An embodiment of the present disclosure further provides a first target device, the first target device is communicatively connected to a second target device, and the first target device is an upstream node device of the relay terminal device, and the second target device is a downstream node device of the relay terminal device, including a processor, a memory, and a computer program that is stored in the memory and that can be run on the processor. When the computer program is executed by the processor, processes of embodiments of the foregoing data transmission method can be achieved, and a same technical effect can be achieved. To avoid repetition, details are not repeated herein.

An embodiment of the present disclosure further provides a computer-readable storage medium. The computer-readable storage medium stores a computer program, where when the computer program is executed by a processor, the processes of the foregoing embodiments of the data transmission method are implemented, and a same technical effect can be achieved. To avoid repetition, details are not described herein again. For example, the computer-readable storage medium may include a non-transitory computer-readable storage medium, such as a Read-Only Memory (ROM), a Random Access Memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementation manners, a person skilled in the art may understand that the foregoing method embodiments may be implemented by software in addition to a necessary universal hardware platform or by hardware only. In most circumstances, the former is an exemplary implementation manner. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

All aspects of this application are described above with reference to flowcharts and/or block diagrams of methods, apparatuses (systems), and machine program products according to embodiments of this application. It should be understood that each block in the flowcharts and/or block diagrams, and a combination of blocks in the flowcharts and/or block diagrams may be implemented by programs or instructions. Those programs or instructions may be provided for a general-purpose computer, a dedicated computer, or a processor of any other programmable data processing device to generate a machine, so that the functions/actions specified in one or more blocks in the flowcharts and/or block diagrams may be implemented via those programs or instructions executed by the computer or any other programmable data processing device. The processor may be but is not limited to a general purpose processor, a dedicated processor, a special application processor, or a field programmable logic circuit. It can be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

The embodiments of the present disclosure are described above with reference to the accompanying drawings, but the present disclosure is not limited to the foregoing specific implementation manners. The foregoing specific implementation manners are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. A data transmission method, performed by a relay terminal device, comprising:

sending first notification information to a second target device when a wireless link between the relay terminal device and a first target device is abnormal, wherein the first notification information is used to reduce data traffic transmitted from the second target device to the relay terminal device or to stop data transmission between the second target device and the relay terminal device, wherein the wireless link between the relay terminal device and the first target device being abnormal comprises at least one of the following:

a quality of a wireless interface signal between the first target device and the relay terminal device is less than a preset quality threshold; or an amount of data buffered by the relay terminal device is greater than or equal to a preset amount threshold, wherein the first target device is further communicatively connected to the second target device directly, and the method further comprises:

sending, by the relay terminal device, second notification information to the first target device directly through a User-uplink (Uu) interface between the relay terminal device and the first target device when the wireless link is abnormal, wherein the second notification information is separate from the first notification information and used to characterize abnormality of the wireless link, and is used to generate third notification information, wherein the third notification information is separate from the first notification information and sent from the first target device to the second target device, wherein the third notification information is used to reduce data traffic transmitted from the second target device to the relay terminal device or to stop data transmission between the second target device and the relay terminal device.

2. The data transmission method according to claim 1, wherein the first target device is an upstream node device of the relay terminal device, and the second target device is a downstream node device of the relay terminal device.

3. The data transmission method according to claim 2, wherein the first notification information comprises at least one of the following:

notification information used to indicate stopping sending data to the relay terminal device;

notification information used to indicate stopping sending a type of data;

notification information used to indicate duration for stopping sending;

notification information used to indicate a data transmission rate to be changed;

notification information used to indicate performing reselection of a transmission resource;

notification information used to indicate performing reselection of a transmission carrier; or notification information used to indicate performing reselection of the relay terminal device.

4. The data transmission method according to claim 1, wherein the third notification information comprises at least one of the following:

notification information used to indicate stopping sending data to the relay terminal device;

notification information used to indicate stopping sending a type of data;

notification information used to indicate duration for stopping sending;

notification information used to indicate a data transmission rate to be changed;

notification information used to indicate that the second target device performs reselection of a transmission resource;

notification information used to indicate performing reselection of a transmission carrier;

notification information used to indicate performing reselection of the relay terminal device; or notification information used to indicate an optional relay terminal device.

5. The data transmission method according to claim 1, wherein the first target device is a downstream node device of the relay terminal device, and the second target device is an upstream node device of the relay terminal device.

6. The data transmission method according to claim 5, wherein the first notification information comprises at least one of the following:

notification information used to indicate stopping sending data to the relay terminal device;

notification information used to indicate stopping sending a type of data;

notification information used to indicate duration for stopping sending; or notification information used to indicate a data transmission rate to be changed.

7. A data transmission method, performed by a first target device, wherein:

the first target device is communicatively connected to a second target device directly, the first target device is an upstream node device of a relay terminal device, the second target device is a downstream node device of the relay terminal device, and first notification information is sent from the relay terminal device to the second target device when a wireless link between the relay terminal device and the first target device is abnormal, the wireless link between the relay terminal device and the first target device being abnormal comprises at least one of the following:

a quality of a wireless interface signal between the first target device and the relay terminal device is less than a preset quality threshold; or an amount of data buffered by the relay terminal device is greater than or equal to a preset amount threshold, and the method comprises:

receiving, by the first target device, second notification information from the relay terminal device directly through a User-uplink (Uu) interface between the relay terminal device and the first target device when the wireless link is abnormal, wherein the second notification information is separate from the first notification information and used to characterize abnormality of the wireless link, and is used to generate third notification information; and sending the third notification information from the first target device to the second target device when the wireless link is abnormal, wherein the third notification information is separate from the first notification information and used to reduce data traffic transmitted from the second target device to the relay terminal device or to stop data transmission between the second target device and the relay terminal device.

8. The data transmission method according to claim 7, wherein the third notification information comprises at least one of the following:

notification information used to indicate stopping sending data to the relay terminal device;

notification information used to indicate stopping sending a type of data;

notification information used to indicate duration for stopping sending;

notification information used to indicate a data transmission rate to be changed;

notification information used to indicate performing reselection of a transmission resource;

notification information used to indicate performing reselection of a transmission carrier;

notification information used to indicate performing reselection of the relay terminal device; or notification information used to indicate an optional relay terminal device.

9. A relay terminal device, comprising: a memory having a computer program stored therein; and a processor, wherein the computer program, when executed by the processor, causes the processor to perform a data transmission method, comprising:

sending first notification information to a second target device when a wireless link between the relay terminal device and a first target device is abnormal, wherein the first notification information is used to reduce data traffic transmitted from the second target device to the relay terminal device or to stop data transmission between the second target device and the relay terminal device, wherein the wireless link between the relay terminal device and the first target device being abnormal comprises at least one of the following:

a quality of a wireless interface signal between the first target device and the relay terminal device is less than a preset quality threshold; or an amount of data buffered by the relay terminal device is greater than or equal to a preset amount threshold, wherein the first target device is further communicatively connected to the second target device directly, and the data transmission method further comprises:

sending, by the relay terminal device, second notification information to the first target device directly through a User-uplink (Uu) interface between the relay terminal device and the first target device when the wireless link is abnormal, wherein the second notification information is separate from the first notification information and used to characterize abnormality of the wireless link, and is used to generate third notification information, wherein the third notification information is separate from the first notification information and sent from the first target device to the second target device, wherein the third notification information is used to reduce data traffic transmitted from the second target device to the relay terminal device or to stop data transmission between the second target device and the relay terminal device.

10. The relay terminal device according to claim 9, wherein the first target device is an upstream node device of the relay terminal device, and the second target device is a downstream node device of the relay terminal device.

11. The relay terminal device according to claim 10, wherein the first notification information comprises at least one of the following:

notification information used to indicate stopping sending data to the relay terminal device;

notification information used to indicate stopping sending a type of data;

notification information used to indicate duration for stopping sending;

notification information used to indicate a data transmission rate to be changed;

notification information used to indicate performing reselection of a transmission resource;

notification information used to indicate performing reselection of a transmission carrier; or notification information used to indicate performing reselection of the relay terminal device.

12. The relay terminal device according to claim 9, wherein the third notification information comprises at least one of the following:

notification information used to indicate stopping sending data to the relay terminal device;

notification information used to indicate stopping sending a type of data;

notification information used to indicate duration for stopping sending;

notification information used to indicate a data transmission rate to be changed;

notification information used to indicate that the second target device performs reselection of a transmission resource;

notification information used to indicate performing reselection of a transmission carrier;

notification information used to indicate performing reselection of the relay terminal device; or notification information used to indicate an optional relay terminal device.

13. The relay terminal device according to claim 9, wherein the first target device is a downstream node device of the relay terminal device, and the second target device is an upstream node device of the relay terminal device.

14. The relay terminal device according to claim 13, wherein the first notification information comprises at least one of the following:

notification information used to indicate stopping sending data to the relay terminal device;

notification information used to indicate stopping sending a type of data;

notification information used to indicate duration for stopping sending; or notification information used to indicate a data transmission rate to be changed.

* * * * *